(12) United States Patent
Donley et al.

(10) Patent No.: US 11,638,111 B2
(45) Date of Patent: Apr. 25, 2023

(54) SYSTEMS AND METHODS FOR CLASSIFYING BEAMFORMED SIGNALS FOR BINAURAL AUDIO PLAYBACK

(71) Applicant: META PLATFORMS TECHNOLOGIES, LLC, Menlo Park, CA (US)

(72) Inventors: Jacob Ryan Donley, Kirkland, WA (US); Vladimir Tourbabin, Sammamish, WA (US); Peter Dodds, Seattle, WA (US); Ravish Mehra, Tacoma, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 90 days.

(21) Appl. No.: 16/905,411

(22) Filed: Jun. 18, 2020

(65) Prior Publication Data
US 2021/0136508 A1    May 6, 2021

Related U.S. Application Data

(60) Provisional application No. 62/929,770, filed on Nov. 1, 2019.

(51) Int. Cl.
*H04S 7/00* (2006.01)
*H04N 5/04* (2006.01)
(Continued)

(52) U.S. Cl.
CPC ............. *H04S 7/304* (2013.01); *H04N 5/04* (2013.01); *H04N 5/607* (2013.01); *H04S 2420/01* (2013.01)

(58) Field of Classification Search
None
See application file for complete search history.

(56) References Cited

U.S. PATENT DOCUMENTS 9,706,292 B2   7/2017   Duraiswami et al.
9,992,449 B1   6/2018   Ashkenazi et al.
(Continued)

OTHER PUBLICATIONS

Brinkmann et al, "A High Resolution and Full-Spherical . . . ". pp. 1-8. Oct. 2017. (Year: 2017).*

(Continued)

*Primary Examiner* — Qin Zhu
(74) *Attorney, Agent, or Firm* — Greenberg Traurig, LLP

(57) ABSTRACT

The disclosed computer-implemented method may include receiving a signal for each channel of an audio transducer array on a wearable device. The method may also include calculating a beamformed signal for each beam direction of a set of beamforming filters for the wearable device. Additionally, the method may include classifying a first beamformed signal from the calculated beamformed signals into a first class of sound and a second beamformed signal from the calculated beamformed signals into a second class of sound. The method may also include adjusting, based on the classifying, a gain of the first beamformed signal relative to the second beamformed signal. Furthermore, the method may include converting the beamformed signals into spatialized binaural audio based on a position of a user. Finally, the method may include transmitting the spatialized binaural audio to a playback device. Various other methods, systems, and computer-readable media are also disclosed.

20 Claims, 10 Drawing Sheets

(51) Int. Cl.
*H04N 5/60* (2006.01)
*H04R 3/00* (2006.01)
*H04R 1/40* (2006.01)

(56) References Cited

U.S. PATENT DOCUMENTS

| | | | | |
|---|---|---|---|---|
| 2004/0076301 | A1* | 4/2004 | Algazi | H04S 7/304 381/310 |
| 2012/0057734 | A1* | 3/2012 | Ambrose | H04R 25/43 381/328 |
| 2013/0315402 | A1* | 11/2013 | Visser | G10L 19/00 381/18 |
| 2014/0006026 | A1 | 1/2014 | Lamb et al. | |
| 2016/0073198 | A1 | 3/2016 | Vilermo et al. | |
| 2017/0094407 | A1* | 3/2017 | McElveen | H04R 1/326 |
| 2017/0098453 | A1 | 4/2017 | Wright et al. | |
| 2017/0353789 | A1* | 12/2017 | Kim | H04R 3/005 |
| 2018/0088900 | A1 | 3/2018 | Glaser et al. | |
| 2018/0246698 | A1 | 8/2018 | Huang | |
| 2019/0139563 | A1* | 5/2019 | Chen | G06N 3/0445 |
| 2019/0208318 | A1* | 7/2019 | Chowdhary | B81B 7/00 |
| 2019/0208345 | A1* | 7/2019 | Mindlin | H04R 5/04 |
| 2019/0246203 | A1* | 8/2019 | Elko | H04R 3/005 |
| 2019/0320260 | A1* | 10/2019 | Alders | H04R 3/005 |
| 2020/0294521 | A1* | 9/2020 | Chen | G02C 11/06 |
| 2022/0150657 | A1* | 5/2022 | Thiergart | H04S 7/302 |

OTHER PUBLICATIONS

Wikipedia, "Ambisonics", URL: https://en.wikipedia.org/wiki/Ambisonics, as accessed on Apr. 29, 2020, pp. 1-14.
"Facebook 360 Video", URL: https://facebook360.fb.com, as accessed on Apr. 29, 2020, pp. 1-5.
International Search Report and Written Opinion received for PCT Application Serial No. PCT/US2020/054570 dated Feb. 15, 2021, 14 pages.
Sydow, Carsten, "Broadband beamforming for a microphone array", The Journal of the Acoustical Society of America, vol. 96, No. 2, Part 01, Aug. 1, 1994, pp. 845-849.
Moore et al., "Personalized signal-independent beamforming for binaural hearing aids", The Journal of the Acoustical Society of America, vol. 145, No. 5, May 16, 2019, pp. 2971-2981.
International Preliminary Report on Patentability for International Application No. PCT/US2020/054570, dated May 12, 2022, 12 pages.

* cited by examiner

SYSTEMS AND METHODS FOR CLASSIFYING BEAMFORMED SIGNALS FOR BINAURAL AUDIO PLAYBACK

CROSS REFERENCE TO RELATED APPLICATION

This application claims the benefit of U.S. Provisional Application No. 62/929,770, filed 1 Nov. 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
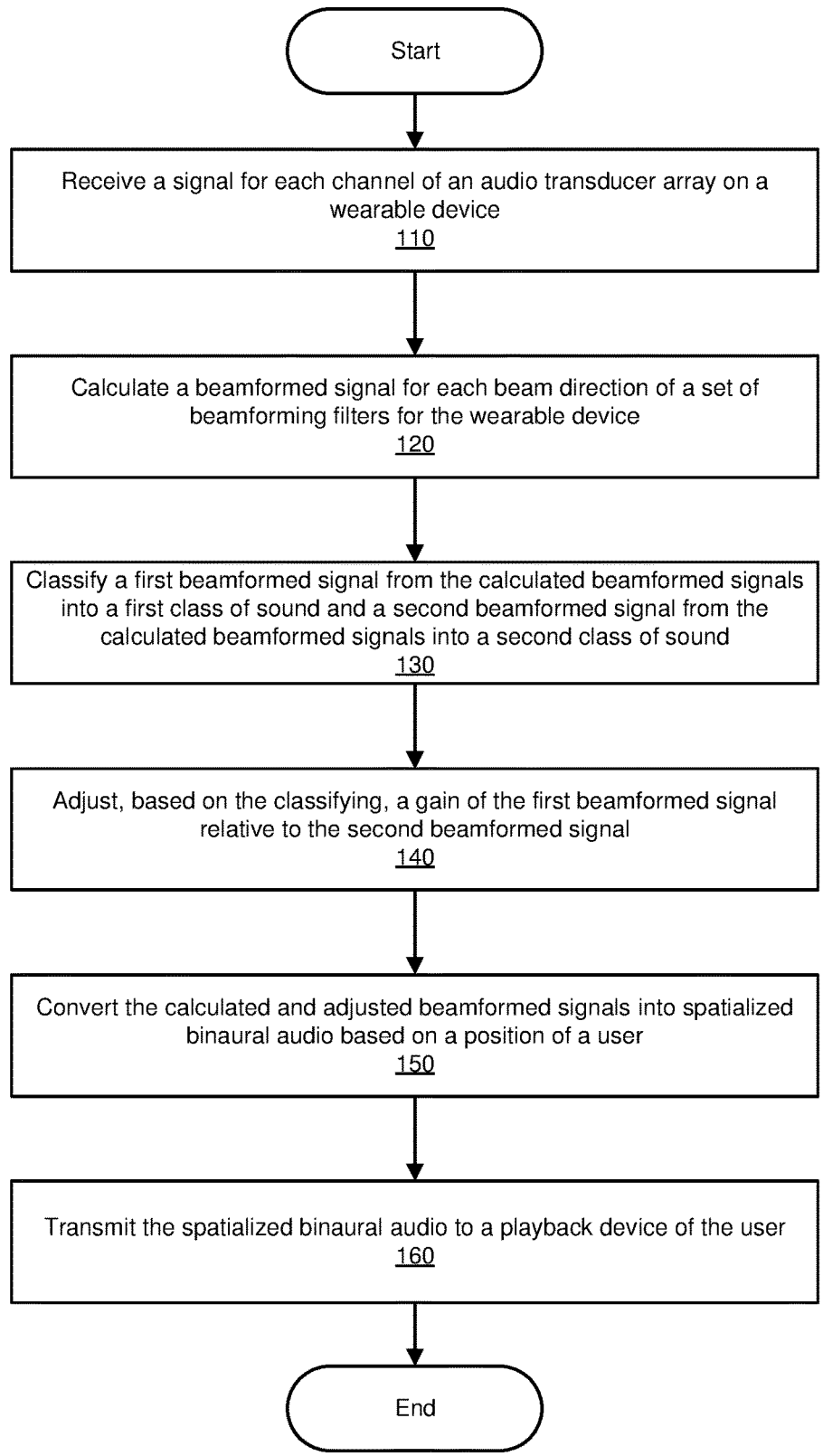
FIG. 1 is a flow diagram of an exemplary method for classifying beamformed signals for binaural audio playback.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Wearable devices, such as virtual or augmented reality systems, enable users to experience various virtual environments without physically being there. For example, users may watch videos or listen to audio captured in remote locations to be immersed in the environments of those locations. Some devices include features like 360-degree immersive video and surround sound audio that enable users to be more realistically immersed in the virtual environment.

Traditionally, devices that capture immersive experiences that are virtually shared with users may be arranged as a spherical mechanism carried on a stick or on a moving platform. However, these traditional devices may not accurately capture a real user's experiences from the user's point of view. For example, a virtual end user may not feel realistically immersed in the environment if a traditional device captures the environment from an elevated or bird's-eye view. Additionally, some users may want to share their physical environment with virtual end users, such as sharing a musical concert experience, and traditional devices may be unwieldy or have difficulty adjusting to the user's movements. These adjustments may be particularly difficult to accurately capture for audio playback. Thus, better methods of capturing and processing audio signals for binaural audio playback are needed to improve the realistic user immersion of virtual experiences.

The present disclosure is generally directed to systems and methods for classifying beamformed signals for binaural audio playback. As will be explained in greater detail below, embodiments of the present disclosure may, by testing a wearable device with an audio transducer array, identify a set of array transfer function (ATFs) and/or a set of head-related transfer functions (HRTFs) for the audio transducer array. By testing the wearable device with a model head in an anechoic chamber, the systems and methods described herein may more accurately capture the set of ATFs and/or HRTFs. The disclosed systems and methods may then use the set of ATFs and/or HRTFs to calculate a set of beamforming filters specific to the wearable device and/or a user wearing the wearable device. Subsequently, the wearable device may be used to capture live audio and/or record re-playable audio, which may be converted into beamformed signals. Additionally, the disclosed systems and methods may classify the beamformed signals into classes of sounds that may be adjusted based on user preference or interest. These systems and methods may then convert the signals into spatialized binaural audio relative to a user's position and may play the signals to the user through a playback device. By tracking the position of a user sharing an experience and/or a virtual end user, the disclosed systems and methods may provide updated spatialized binaural audio in real time.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
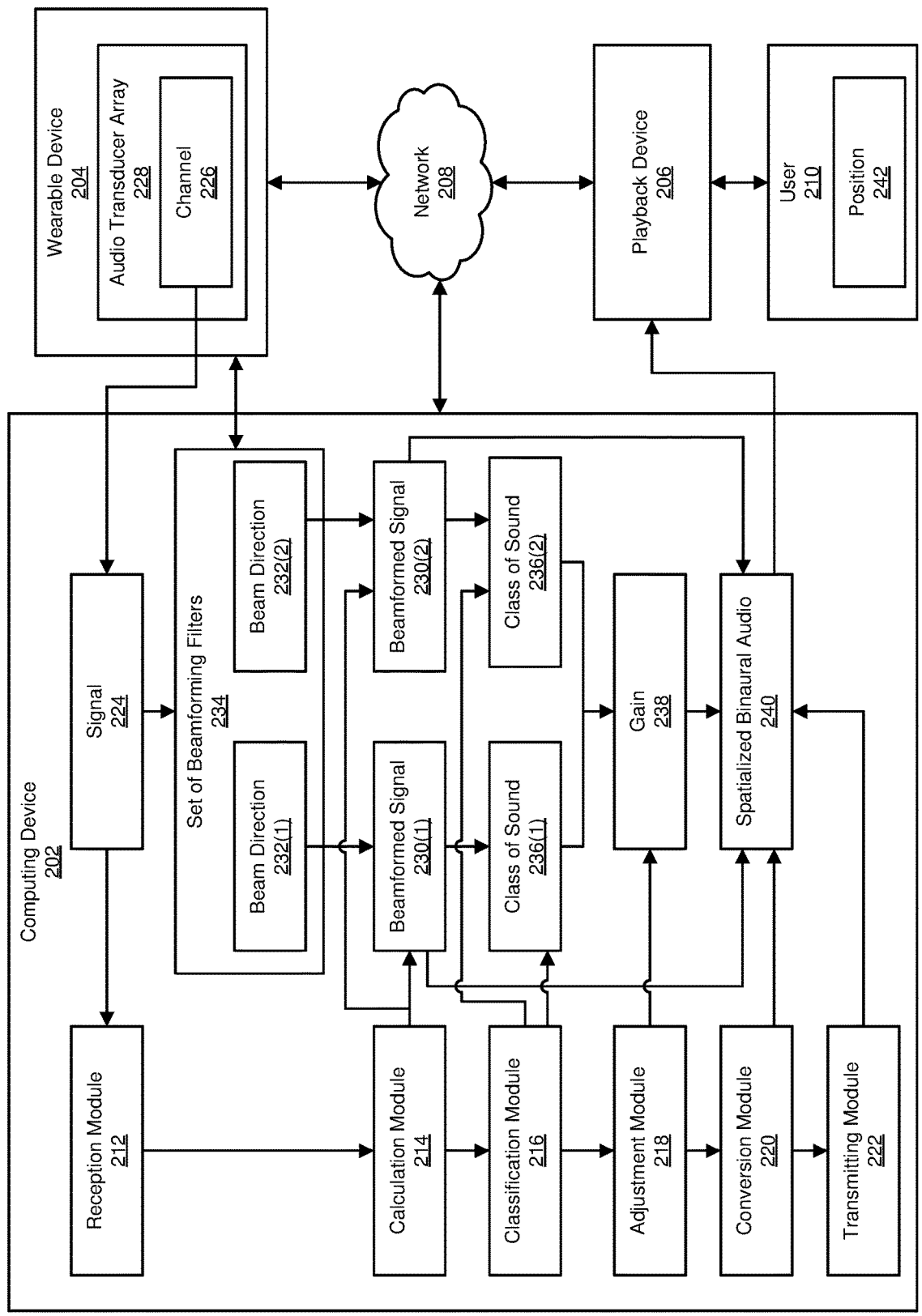
FIG. 2 is a block diagram of an exemplary system for classifying beamformed signals for binaural audio playback.
Figure 3:
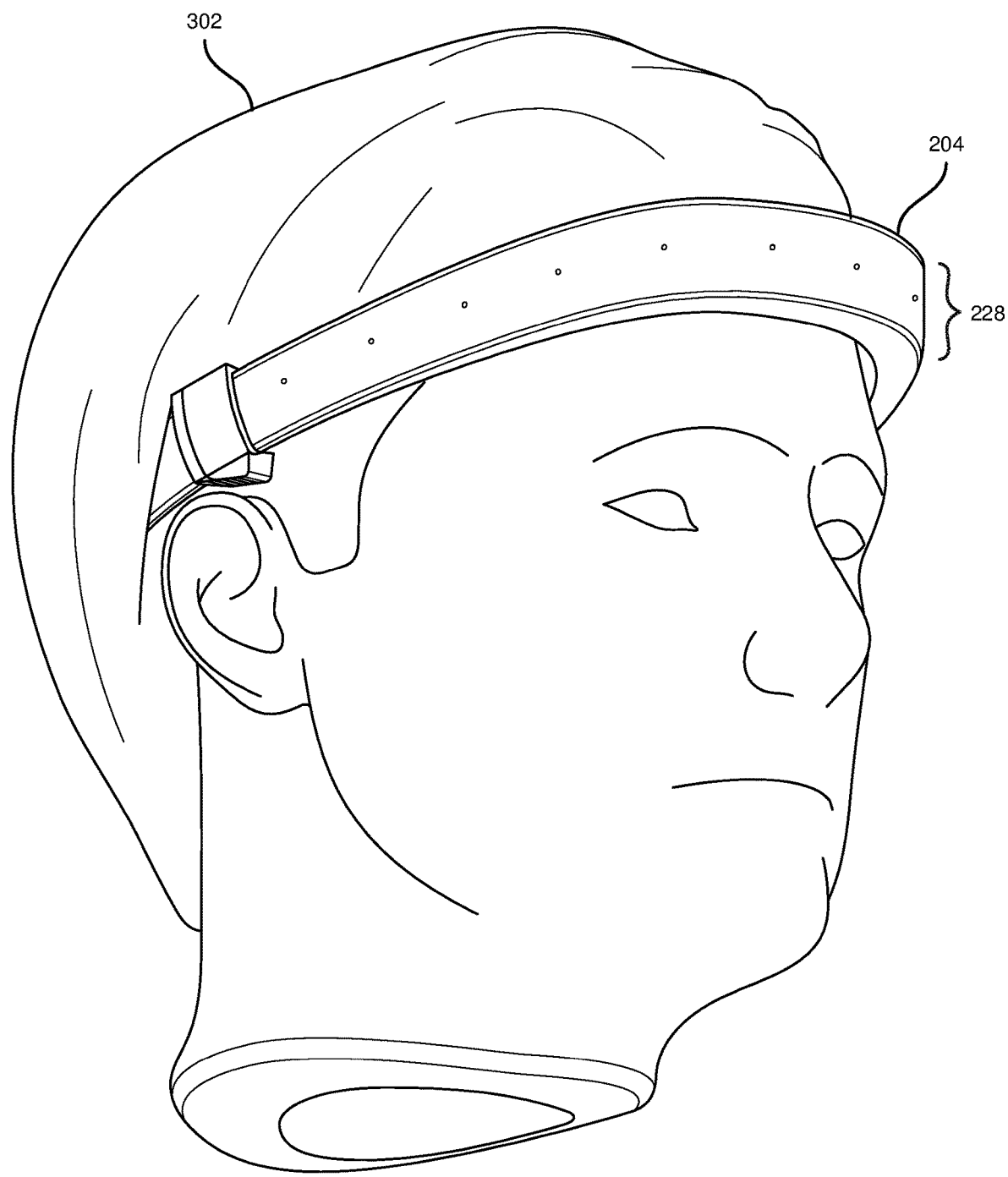
FIG. 3 illustrates an exemplary wearable device with an exemplary audio transducer array worn on an exemplary model head.
Figure 4:
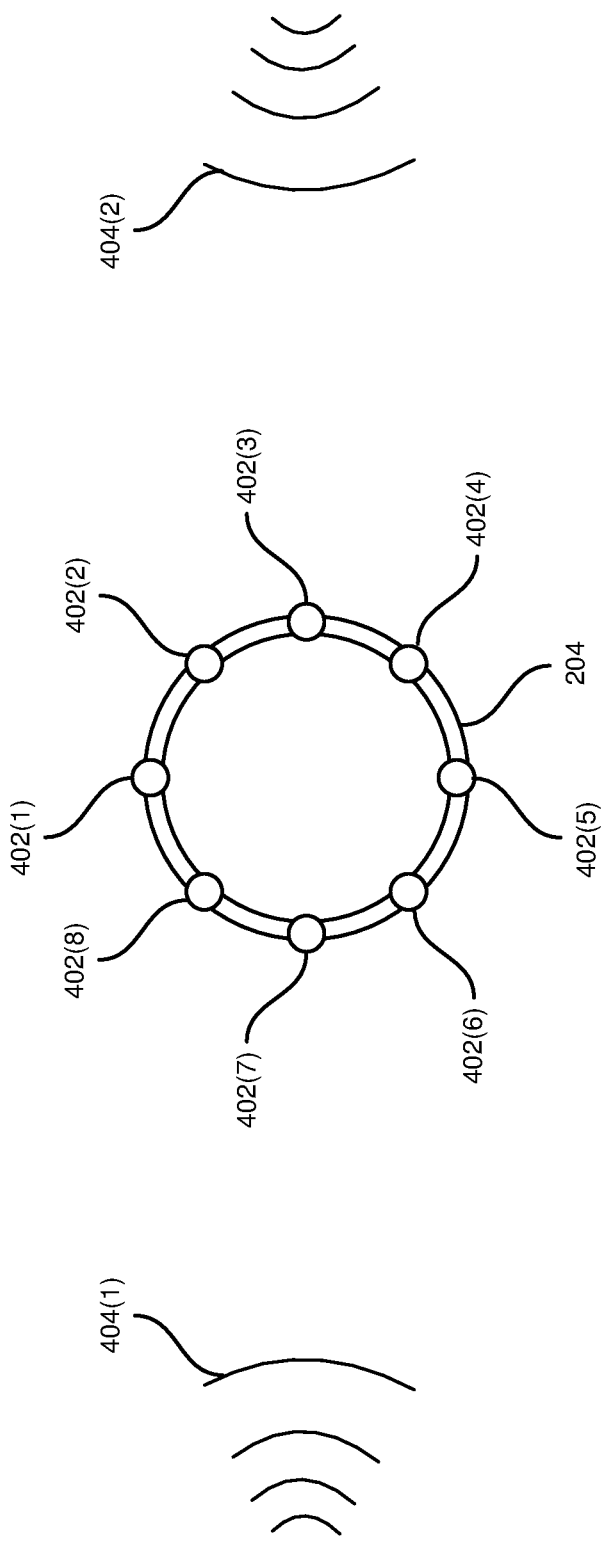
FIG. 4 illustrates exemplary audio captured by the exemplary wearable device.
Figure 7:
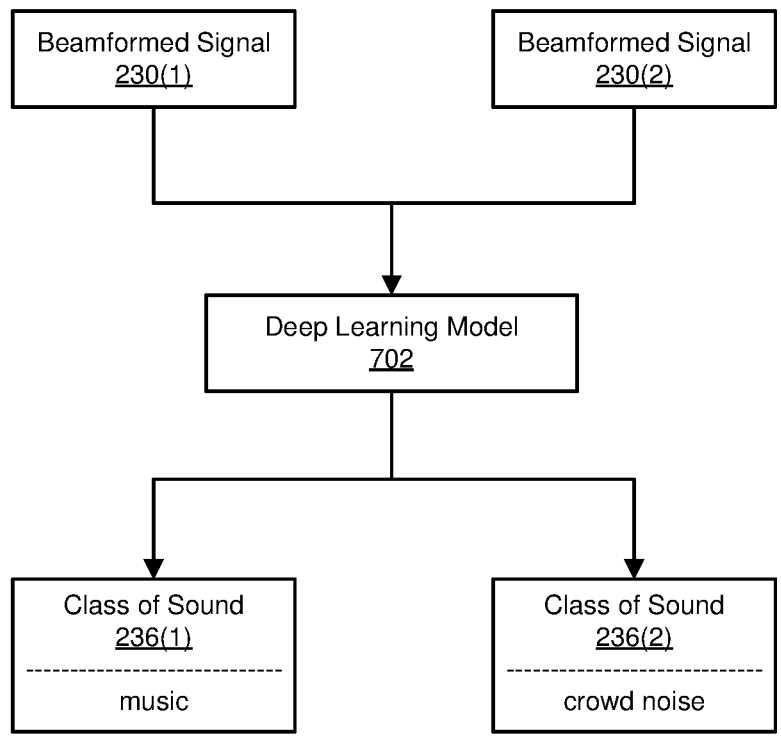
FIG. 7 is a block diagram of an exemplary classification of the beamformed signals.
Figure 8:
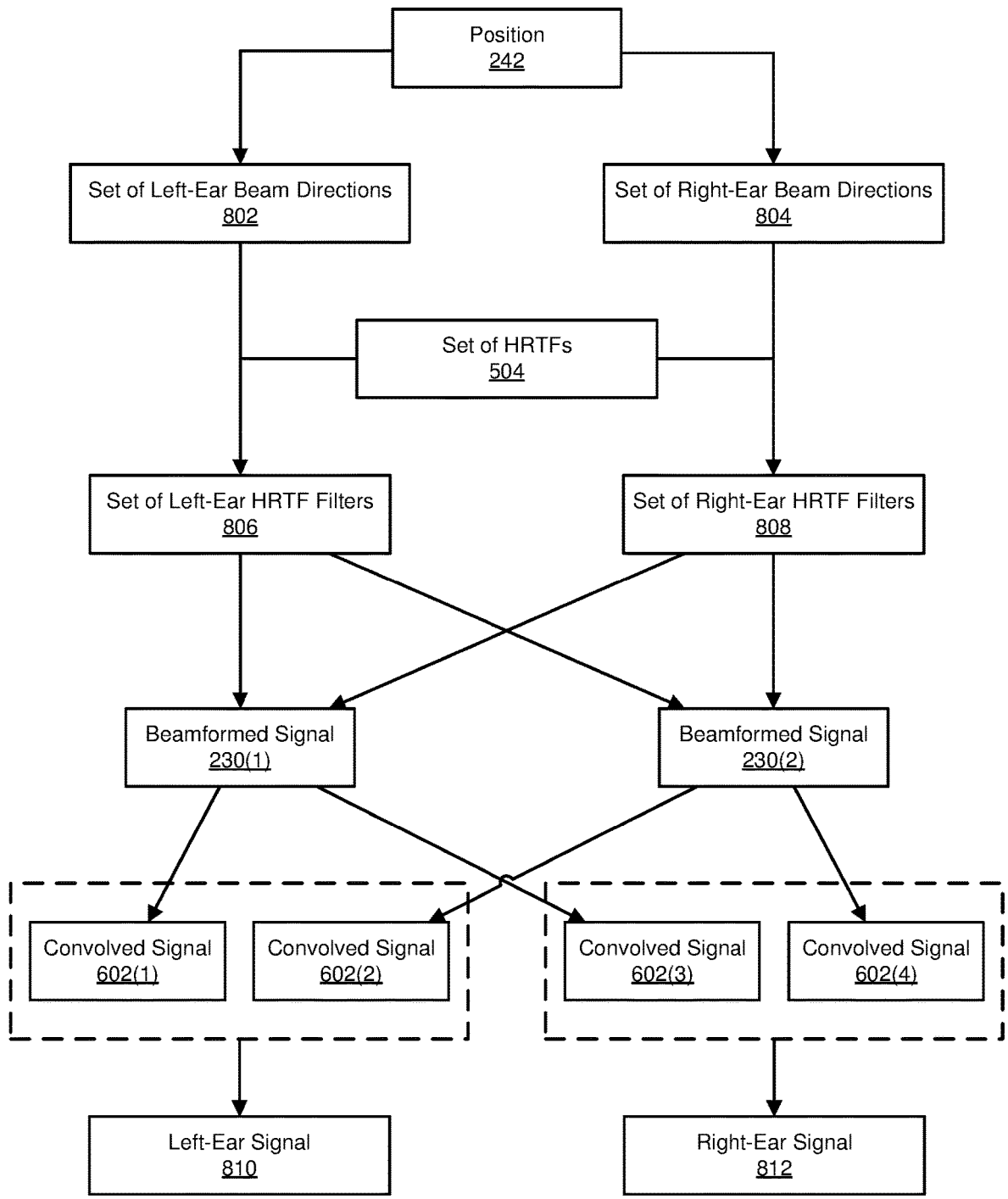
FIG. 8 is a block diagram of an exemplary conversion of the beamformed signals to binaural audio based on a user's position.

The following will provide, with reference to FIG. 1, detailed descriptions of computer-implemented methods for classifying beamformed signals for binaural audio playback. FIG. 2 illustrates detailed descriptions of a corresponding exemplary system. In addition, FIG. 3 illustrates detailed descriptions of an exemplary wearable device with an exemplary audio transducer array worn on a model head. FIG. 4 illustrates detailed descriptions of exemplary audio captured by the exemplary wearable device. Furthermore, FIGS. 5 and 6 respectively illustrate detailed descriptions of an exemplary calculation of beamforming filters for the exemplary wearable device and a subsequent exemplary calculation of beamformed signals. FIG. 7 illustrates detailed descriptions of classifying beamformed sounds. FIG. 8 illustrates detailed descriptions of an exemplary conversion of the beamformed signals to binaural audio based on a user's position. Finally, FIGS. 9 and 10 respectively illustrate detailed descriptions of exemplary augmented-reality glasses and an exemplary virtual-reality headset that may be used in connection with embodiments of this disclosure.

FIG. 1 is a flow diagram of an exemplary computer-implemented method 100 for classifying beamformed signals for binaural audio playback. The steps shown in FIG. 1 may be performed by any suitable computer-executable code and/or computing system, including computing device 202 illustrated in FIG. 2, augmented-reality system 900 illustrated in FIG. 9, and/or virtual-reality system 1000 illustrated in FIG. 10. In one example, each of the steps shown in FIG. 1 may represent an algorithm whose structure includes and/or is represented by multiple sub-steps, examples of which will be provided in greater detail below.

As illustrated in FIG. 1, at step 110, one or more of the systems described herein may receive a signal for each channel of an audio transducer array on a wearable device. For example, FIG. 2 is a block diagram of a computing device 202 for classifying beamformed signals for binaural audio playback. As illustrated in FIG. 2, a reception module 212 may, as part of computing device 202, receive a signal 224 for a channel 226 of an audio transducer array 228 on a wearable device 204.

The systems described herein may perform step 110 in a variety of ways. In some examples, the term "audio transducer" may refer to a device that captures and/or plays audio signals by converting between electrical signals and sound waves. Examples of audio transducers may include, without limitation, microphones, speakers, and/or any other device capable of processing or transmitting audio signals. As used herein, the term "audio transducer array" may refer to a set of audio transducers arranged to capture or transmit audio from a variety of different directions or angles. For example, audio transducer array 228 of FIG. 3 may represent an array of microphones that capture sounds from different directions relative to a user's head. In some examples, the term "channel" may refer to a communication channel that transports an electronic signal, such as an audio signal. In some embodiments, an audio transducer array may include a separate channel for each audio transducer. In other embodiments, the audio transducer array may include multiple channels for each audio transducer or multiple audio transducers that correspond to each channel.

In some examples, the term "wearable device" may refer to any device worn on the head of a user and fitted with an array of audio transducers. For example, a wearable device may refer to wearable device 204 in FIG. 3, augmented-reality system 900 in FIG. 9, and/or virtual-reality system 1000 in FIG. 10. In some examples, the term "binaural audio" may refer to separate audio signals transmitted to two ears of a user. In these examples, spatialized binaural audio may replicate audio from directions relative to the position of the user's head and ears when wearing the wearable device to produce virtual sounds corresponding to sounds from a physical space.

Furthermore, in some embodiments, computing device 202 may receive signal 224 via a wired or wireless network, such as a network 208, or may receive signal 224 directly via a broadcast from wearable device 204. In some examples, the term "network" may refer to any medium or architecture capable of facilitating communication or data transfer. Examples of networks include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), or the like.

Returning to FIG. 1, at step 120, one or more of the systems described herein may calculate a beamformed signal for each beam direction of a set of beamforming filters for the wearable device. For example, a calculation module 214 may, as part of computing device 202 in FIG. 2, calculate a beamformed signal 230(1) and a beamformed signal 230(2) for a beam direction 232(1) and a beam direction 232(2) of a set of beamforming filters 234 for wearable device 204.

The systems described herein may perform step 120 in a variety of ways. In some examples, the term "beam" may refer to a directional signal transmission or reception, and the term "beam direction" may refer to the direction of transmitting or receiving such a signal. For example, each beam direction may correspond to an audio transducer in audio transducer array 228. In some examples, the term "beamforming" may refer to a method of processing signals to steer the response in a particular direction. In these examples, beamforming may be performed using filters, such as maximum directivity beamforming filters, to direct the signals of the audio transducers to focus on a beam direction.

In some embodiments, the set of beamforming filters may include preprocessed filters created by testing the audio transducer array of the wearable device in an anechoic chamber. In some examples, the term "anechoic chamber" may refer to a room designed to deaden sound in an attempt to prevent echoes. For example, an anechoic chamber may be coated with materials or constructs that absorb sound.

In these embodiments, testing the audio transducer array of the wearable device may include capturing test audio with the audio transducer array of the wearable device worn on a model head, measuring a set of array transfer functions for the audio transducer array based on the captured test audio, and calculating the set of beamforming filters using the set of ATFs. Alternatively, some embodiments may test the wearable device using a test user or multiple users. Additionally, measuring the set of ATFs may include measuring a set of HRTFs either as part of the set of ATFs or as a separate set of functions. In some examples, the term "array transfer function" or ATF may refer to a mathematical function that models how audio signals are received by an audio transducer array. Similarly, in some examples, the term "head-related transfer function" or HRTF may refer to a mathematical function that models how audio signals are received by a human head, especially by the ears. In these examples, each ATF may differ for each audio transducer, and each HRTF may differ for each ear. In some examples, the disclosed methods may estimate specific ATFs and/or HRTFs from models trained using multiple different ATFs and/or HRTFs or from other analytical or theoretical transfer functions. In further examples, a set of relative transfer functions (RTFs) or other similar transfer functions may be calculated from the set of ATFs using a predefined reference audio transducer to narrow the set of transfer functions used in calculating beamformed signals.

For example, as illustrated in FIG. 3, wearable device 204 may include audio transducer array 228 of an array of microphones spanning an arc around wearable device 204. In other examples, audio transducer array 228 may represent a different configuration of microphones and/or other audio transducers on wearable device 204. Additionally, in this example, wearable device 204 may be placed on a model head 302 to test wearable device 204 in the anechoic chamber. In some examples, model head 302 may include a head and a bust or any other model replica to represent a user that may wear wearable device 204. By using model head 302, the disclosed systems may more accurately capture the set of ATFs for wearable device 204 and, therefore, more accurately calculate the set of beamforming filters 234 of FIG. 2.

As illustrated in FIG. 4, wearable device 204 may include audio transducers 402(1)-(8) facing multiple directions to capture and/or record a sphere of sound. In this example, multiple test audio signals, such as test audio 404(1) and a test audio 404(2), may be captured from different directions to more accurately calculate the set of ATFs and/or the set of HRTFs. In other examples, the disclosed methods may use additional test audio signals from a multitude of directions to fully capture the range of audio signals and directions that wearable device 204 may detect.

Furthermore, in some embodiments, the set of ATFs and/or the set of HRTFs may be stored in cloud storage, on wearable device 204, and/or on a separate device to be used in future audio processing. For example, wearable device 204 may store the set of ATFs tested for wearable device 204 in local data storage. When capturing new audio signals, wearable device 204 may access the stored set of ATFs to compute beamformed signals for the new audio signals. In this example, wearable device 204 may store the beamformed signals with the stored set of ATFs. In other examples, computing device 202 may store the set of ATFs and/or the beamformed signals locally for easier processing. Alternatively, a playback device 206 may store the set of ATFs and/or the beamformed signals locally to process recorded audio before playback.

Figure 5:
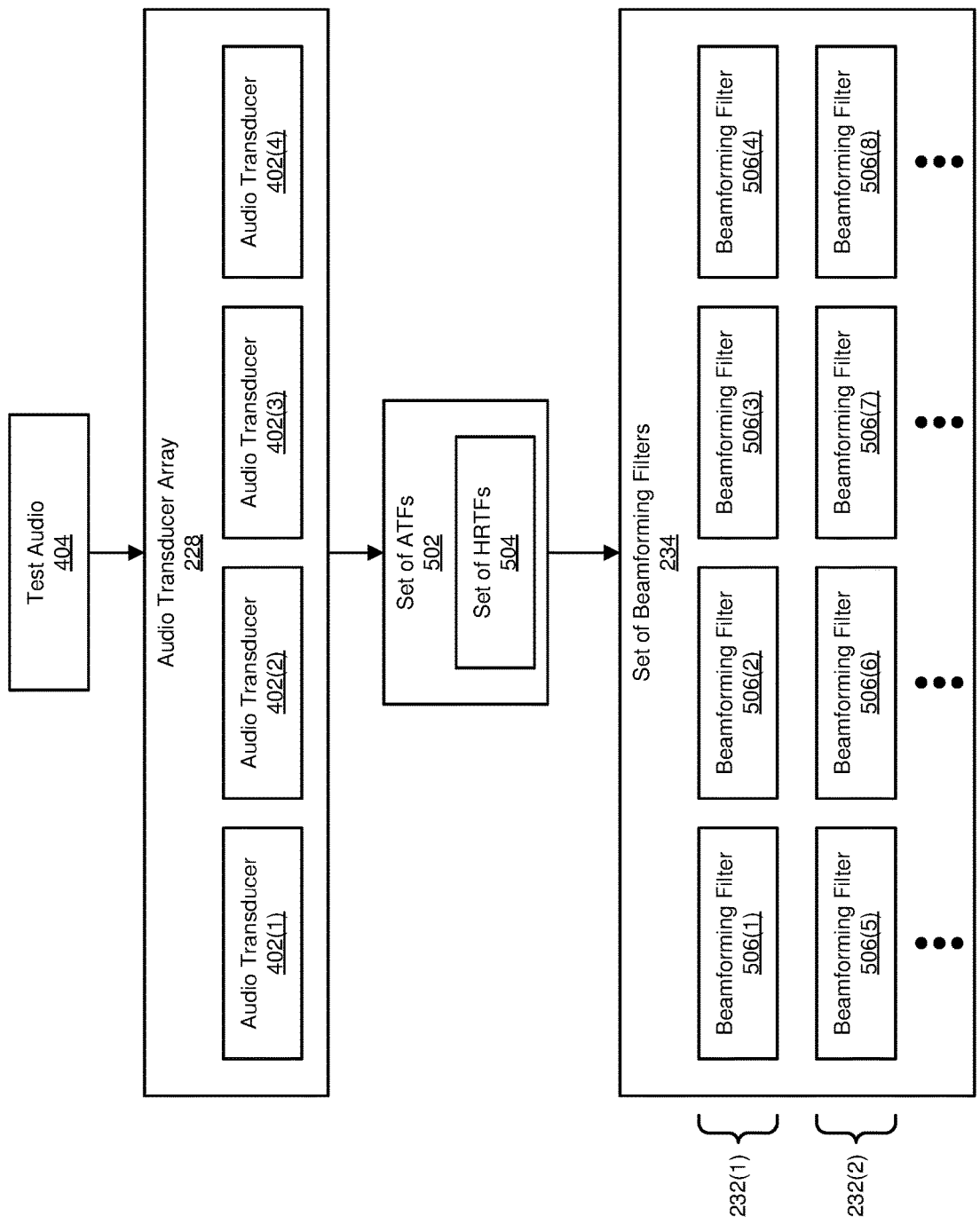
FIG. 5 is a block diagram of an exemplary calculation of beamforming filters for the exemplary wearable device.

As shown in FIG. 5, audio transducer array 228, which may include audio transducers 402(1)-(4), may capture test audio 404. In this example, wearable device 204 of FIG. 2 may measure a set of ATFs 502 for audio transducer array 228. Additionally, in this example, wearable device 204 may measure a set of HRTFs 504 as part of set of ATFs 502. In alternate examples, set of HRTFs 504 may represent a separate set of transfer functions. Subsequently, in the example of FIG. 5, computing device 202 may calculate set of beamforming filters 234 to include beamforming filters 506(1)-(4) for each of audio transducers 402(1)-(4) to correspond to beam direction 232(1) and beamforming filters 506(5)-(8) to correspond to beam direction 232(2). In some examples, computing device 202 may calculate additional beamforming filters for each additional beam direction of interest. For example, computing device 202 may calculate beamforming filters for each beam direction of each audio transducer and/or from strategic beam directions around a sphere.

In some embodiments, calculating the beamformed signal may include convolving each received signal with a corresponding beamforming filter for the beam direction and taking a sum of the convolved signals for the beam direction. In some examples, the term "convolve" may refer to a mathematical process of computing a function that describes how two other functions interact. For example, computing device 202 may use the set of ATFs to create an isotropic or diffuse noise covariance matrix and may calculate a coefficient for each beamforming filter using the matrix. In these examples, the convolved signal may describe how the beamforming filter modifies the received signal. Additionally, computing device 202 may process the convolved signal to improve a signal-to-noise ratio, reduce distortion, or improve other aspects of the convolved signal. In the above embodiments, computing device 202 may calculate set of beamforming filters 234 for wearable device 204, which may be the same device or type of device used to capture signal 224.

In the example of FIG. 3, each microphone of wearable device 204 may receive a signal, and computing device 202 may calculate a beamforming filter, for each direction, which may include directions in which each microphone is facing and/or other strategic directions. In this example, each microphone may receive multiple signals that computing device 202 may convolve and sum to generate a single beamformed signal for the microphone or audio transducer.

Figure 6:
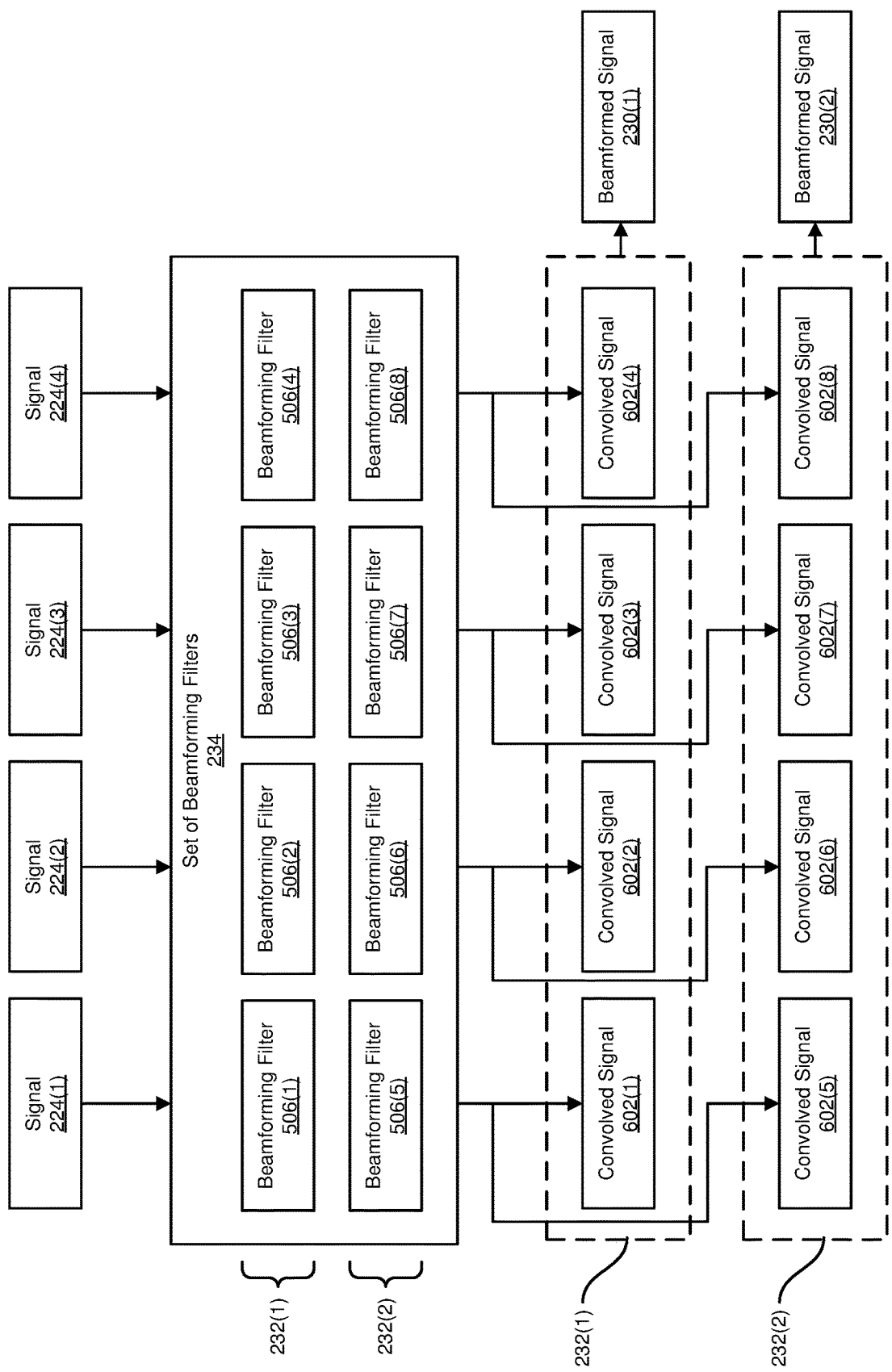
FIG. 6 is a block diagram of an exemplary calculation of beamformed signals.

As shown in FIG. 6, wearable device 204 may receive signals 224(1)-(4), with each signal corresponding to one of audio transducers 402(1)-(4) of FIG. 5. Alternatively, each audio transducer may include multiple channels to capture multiple signals. In the example of FIG. 6, computing device 202 may convolve each of signals 224(1)-(4) with two beamforming filters from set of beamforming filters 234 that correspond to beam directions 232(1) and 232(2) to create two convolved signals. For example, computing device 202 may convolve signal 224(1) with beamforming filter 506(1) and beamforming filter 506(5), resulting in a convolved signal 602(1) and a convolved signal 602(5), respectively. In this example, computing device 202 may take the sum of convolved signals 602(1)-(4) to calculate beamformed signal 230(1). Similarly, in this example, computing device 202 may take the sum of convolved signals 602(5)-(8) to calculate beamformed signal 230(2). In other examples, computing device 202 may convolve each signal with additional beamforming filters from set of beamforming filters 234 for additional beam directions captured by testing wearable device 204 and/or a number of beam directions based on an estimated optimal performance for wearable device 204.

Returning to FIG. 1, at step 130, one or more of the systems described herein may classify a first beamformed signal from the calculated beamformed signals into a first class of sound and may classify a second beamformed signal from the calculated beamformed signals into a second class of sound. For example, a classification module 216 may, as part of computing device 202 in FIG. 2, classify beamformed signal 230(1) into a first class of sound 236(1) and beamformed signal 230(2) into a second class of sound 236(2).

The systems described herein may perform step 130 in a variety of ways. In one embodiment, the first class of sound may include a class of sound selected by the user and/or a predetermined class of sound. Similarly, the second class of sound may include an alternate class of sound selected by the user and/or a predetermined alternate class of sound. For example, a user 210 may identify an interesting class of sound, such as music from a concert, and select the interesting class as class of sound 236(1). As another example, classification module 216 may determine beamformed signal 230(2) represents ambient background noise and select that as class of sound 236(2). Additionally, in some embodiments, classifying the first beamformed signal and the second beamformed signal may include applying a deep learning model of sound classification to the first beamformed signal and the second beamformed signal. In some examples, the term "deep learning" may refer to a machine learning method that can learn from unlabeled data using multiple processing layers in a semi-supervised or unsupervised way. In some embodiments, the deep learning model may learn from signal 224 from wearable device 204. Additionally or alternatively, the deep learning model may learn from additional signals, such as signals from prior recording sessions and/or signals from other wearable devices.

As shown in the example of FIG. 7, a deep learning model 702 may classify beamformed signal 230(1) into class of sound 236(1). Deep learning model 702 may also classify beamformed signal 230(2) into a different class of sound 236(2). For example, as in the above scenario of a music concert, beamformed signal 230(1) may represent a signal from the direction of a stage and may mostly include sounds of music playing from the stage. Thus, deep learning model 702 may classify beamformed signal 230(1) as "music." In contrast, beamformed signal 230(2) may be more prominently composed of non-music sounds, and deep learning model 702 may classify beamformed signal 230(2) as "crowd noise." In other examples, deep learning model 702 may classify multiple beamformed signals into the same class of sound. Additionally, deep learning model 702 may attempt to identify multiple classes of sounds that are of interest to users and may prioritize the classification of interesting sounds in comparison with other types of sound. Furthermore, users may select classes of sounds that are interesting for classification.

Returning to FIG. 1, at step 140, one or more of the systems described herein may adjust, based on the classifying, a gain of the first beamformed signal relative to the second beamformed signal. For example, an adjustment module 218 may, as part of computing device 202 in FIG. 2, adjust a gain 238 of beamformed signal 230(1) relative to beamformed signal 230(2) based on class of sound 236(1) and class of sound 236(2).

The systems described herein may perform step 140 in a variety of ways. In some examples, the term "gain" may refer to an increase in the input signal for audio playback, which may result in an increase in playback volume. In some embodiments, class of sound 236(1) may represent an interesting class of sound, such as music, while class of sound 236(2) may represent a less interesting class of sound, such as ambient background noise. In these embodiments, user 210 may preferentially select class of sound 236(1), and computing device 202 may increase beamformed signal 230(1) such that the music sounds louder than the ambient background noise during playback. For example, user 210 may determine how much to adjust the gain of each class of sound. Alternatively, adjustment module 218 may automatically determine whether and how much to adjust gain 238, relative to beamformed signal 230(2), using the deep learning model. For example, adjustment module 218 may increase the gain of signals classified into interesting classes of sounds and reduce the gain of the other signals, combining the different classes into new signals for sound mixing. In other examples, adjustment module 218 may adjust the gains of multiple classes of sounds, with relative gains dependent on the importance of each class of sound, or may adjust classified beamformed signals relative to non-classified signals. Adjustment module 218 may also apply various other sound processing adjustments to enhance interesting classes of sounds.

Returning to FIG. 1, at step 150, one or more of the systems described herein may convert beamformed signals into spatialized binaural audio based on a position of a user. For example, a conversion module 220 may, as part of computing device 202 in FIG. 2, convert beamformed signals 230(1) and 230(2) into spatialized binaural audio 240 based on a position 242 of user 210.

The systems described herein may perform step 150 in a variety of ways. In some examples, converting the calculated and adjusted beamformed signals into the spatialized binaural audio may include identifying a set of left-ear beam directions and a set of right-ear beam directions based on the position of the user, calculating a left-ear signal for the set of left-ear beam directions, and calculating a right-ear signal for the set of right-ear beam directions. In some examples, the disclosed systems may convert the classified and adjusted beamformed signals in conjunction with any non-classified beamformed signals. By calculating separate signals for each ear, the systems described herein may enable spatialized binaural audio 240 to replicate the user experience of hearing sounds within a physical environment. Additionally, the systems described herein may include sensors and/or head tracking to determine the position of a user, such as deriving position 242 based on an orientation of wearable device 204 or playback device 206 when worn by user 210 of FIG. 2. In some embodiments, wearable device 204 may record position 242 for a user recording or broadcasting an experience, and playback device 206 may replicate the experience using position 242. In other embodiments, position 242 may represent a separate position for user 210 of playback device 206, independent of a position of the broadcasting user of wearable device 204.

In these examples, calculating the left-ear signal may include convolving the beamformed signals with a set of left-ear HRTF filters for the set of left-ear beam directions and taking a sum of the convolved beamformed signals for the set of left-ear beam directions. Similarly, calculating the right-ear signal may include convolving the beamformed signals with a set of right-ear HRTF filters for the set of right-ear beam directions and taking a sum of the convolved beamformed signals for the set of right-ear beam directions. In these examples, conversion module 220 may derive the set of left-ear HRTF filters and the set of right-ear HRTF filters from the set of HRTFs of wearable device 204 and/or of user 210. Additionally, the set of left-ear HRTF filters and the set of right-ear HRTF filters may be disjoint sets of filters or may be overlapping sets of filters. Furthermore, the set of left-ear HRTF filters and/or the set of right-ear HRTF filters may match the beam directions for wearable device 204, which may also match the beam directions for playback device 206 when position 242 of user 210 matches the position of the user recording or broadcasting using wearable device 204. In these examples, calculating the left-ear signal and/or the right-ear signal may include convolving the beamformed signals for each potential beam direction of wearable device 204.

As shown in FIG. 8, conversion module 220 may calculate a set of left-ear beam directions 802 and a set of right-ear beam directions 804 from position 242. In this example, conversion module 220 may derive an appropriate set of left-ear HRTF filters 806 and a set of right-ear HRTF filters 808 from set of HRTFs 504. In this example, convolving beamformed signals 230(1) and 230(2) with set of left-ear HRTF filters 806 may result in convolved signals 602(1) and 602(2). Similarly, convolving beamformed signals 230(1) and 230(2) with set of right-ear HRTF filters 808 may result in convolved signals 602(3) and 602(4). Conversion module 220 may then take a sum of convolved signals 602(1) and 602(2) to derive a left-ear signal 810, while a sum of convolved signals 602(3) and 602(4) may derive a right-ear signal 812. Together, left-ear signal 810 and right-ear signal 812 may represent spatialized binaural audio 240.

Returning to FIG. 1, at step 160, one or more of the systems described herein may transmit the spatialized binaural audio to a playback device of the user. For example, a transmitting module 222 may, as part of computing device 202 in FIG. 2, transmit spatialized binaural audio 240 to playback device 206 of user 210.

The systems described herein may perform step 160 in a variety of ways. In one embodiment, spatialized binaural audio 240 may be shared as part of a live streaming event.

In other embodiments, spatialized binaural audio 240 may be posted online, such as to a social media website, and user 210 may replay the experience using playback device 206.

In some examples, playback device 206 may represent wearable device 204 or the same type of device as wearable device 204. In these examples, by using the same type of device to capture and play audio, spatialized binaural audio 240 may more accurately replicate signal 224. In alternate examples, the systems described herein may adjust spatialized binaural audio 240 to improve accuracy of playback on a different playback device. Additionally, in some examples, computing device 202 may represent a part of wearable device 204 or a separate device and may transmit spatialized binaural audio 240 to wearable device 204 and/or playback device 206, such as via network 208. In alternate examples, computing device 202 may represent a part of playback device 206 that receives signal 224 from wearable device 204 and converts it to spatialized binaural audio 240.

In some embodiments, the above described systems may further detect a new position of the user and may recalculate the spatialized binaural audio for the new position of the user. In these embodiments, spatialized binaural audio 240 may be dynamically calculated based on changes in position 242 of user 210. In the example of FIG. 2, user 210 may represent an end user virtually experiencing the captured audio. Additionally or alternatively, user 210 may represent a user capturing the audio, and wearable device 204 may calculate a change in position 242 from changes in capturing the audio. For example, in the previously described concert scenario, a current position of user 210 may be facing toward the stage, and computing device 202 may calculate beam directions 232(1) and 232(2) as a forward and backward directional alignment. In this example, user 210 may turn such that computing device 202 recalculates beam directions 232(1) and 232(2) as a right and left alignment, with beamformed signals 230(1) and 230(2) recalculated with alternate filters into a new spatialized binaural audio that the virtual end user may play using playback device 206. In other words, computing device 202 may recalculate the beamformed signals based on a relative position of user 210 to an original position when capturing signal 224.

In one embodiment, the above described systems may further adjust the timing of a corresponding video based on the timing of the spatialized binaural audio and transmit the adjusted video to the playback device of the user. For example, applying beamforming filters to an audio signal may result in delays to the original signal, and the corresponding video may be delayed to match the audio delay. In this embodiment, playback device 206 may include a screen or projection, such as with an augmented reality or virtual reality headset, and playback device 206 may play video in conjunction with spatialized binaural audio 240. For example, playback device 206 may represent virtual-reality system 1000 of FIG. 10. In this example, virtual-reality system 1000 may display the video with adjusted timing on a display of front rigid body 1002 to match a timing of spatialized binaural audio 240 played through audio transducers 1006(A) and 1006(B).

In these embodiments, similar to the recalculation of spatialized binaural audio 240, the disclosed systems may recalculate the timing of the video to match the new position. For example, an end user may experience rotating video corresponding to rotating sound field movement as the user capturing the audio and video turns. Alternatively, the above described systems may adjust a timing of the spatialized binaural audio based on a timing of the corresponding video.

As explained above in connection with method 100 in FIG. 1, the disclosed systems and methods may, by capturing audio with an audio transducer array on a wearable device and converting the audio to spatialized binaural audio, improve the virtual experience of an end user. Specifically, the disclosed systems and methods may first test the audio transducer array to create a set of beamforming filters applicable to the specific audio transducer array. The systems and methods described herein may then capture audio signals using the wearable device and use the set of beamforming filters to calculate beamformed signals. For example, a user may wear the wearable device to capture an environment that may be virtually shared with other users. By measuring ATFs and/or HRTFs specific to the audio transducer array of the wearable device, the systems and methods described herein may ensure the beamformed signals calculated from the captured audio is more accurate for the wearable device. The systems and methods described herein additionally classify the beamformed signals into interesting classes of sounds and adjust the beamformed signals to potentially enhance preferred classes of sound. Furthermore, the systems described herein may convert the resulting signals to spatialized binaural audio to be played on a playback device of an end user. Based on a position of the user capturing the audio and/or a position of the end user, the disclosed system and methods may recalculate the spatialized binaural audio to adjust to a new position and may adjust the timing of a corresponding video based on the spatialized binaural audio.

By incorporating the audio transducer array into a wearable device worn on the head of a user, the disclosed systems and methods may more accurately capture the sound field as the user hears and experiences it, which may result in higher fidelity reproduction of the sound field for an end user. For example, because the binaural audio playback adjusts to movements of the user capturing the sound and/or the end user, the end user may feel more immersed in the environment. Additionally, by improving the portability of the audio transducer array, the disclosed systems and methods may improve the ability for individual users to capture and share virtual experiences. Furthermore, by classifying beamformed signals and adjusting the gains of the signals, the disclosed systems and methods may improve the playback of interesting classes of sounds or enable users to perform sound mixing as they prefer. Thus, the systems and methods described herein may improve the immersive experience of binaural audio playback for virtual users.

EXAMPLE EMBODIMENTS

Example 1: A computer-implemented method for classifying beamformed signals for binaural audio playback may include 1) receiving, by a computing device, a signal for each channel of an audio transducer array on a wearable device, 2) calculating, by the computing device, a beamformed signal for each beam direction of a set of beamforming filters for the wearable device, 3) classifying, by the computing device, a first beamformed signal from the calculated beamformed signals into a first class of sound and a second beamformed signal from the calculated beamformed signals into a second class of sound, 4) adjusting, based on the classifying, a gain of the first beamformed signal relative to the second beamformed signal, 5) converting, by the computing device, the calculated and adjusted beamformed signals into spatialized binaural audio based on a position of a user, and 6) transmitting the spatialized binaural audio to a playback device of the user.

Example 2: The computer-implemented method of Example 1, wherein the set of beamforming filters may include preprocessed filters created by testing the audio transducer array of the wearable device in an anechoic chamber.

Example 3: The computer-implemented method of any of Examples 1 and 2, wherein testing the audio transducer array of the wearable device may include capturing test audio with the audio transducer array of the wearable device worn on a model head, measuring a set of array transfer functions (ATFs) for the audio transducer array based on the captured test audio, and calculating the set of beamforming filters using the set of ATFs.

Example 4: The computer-implemented method of any of Examples 1-3, wherein measuring the set of ATFs may further include measuring a set of head-related transfer functions (HRTFs).

Example 5: The computer-implemented method of any of Examples 1-4, wherein calculating the beamformed signal may include convolving each received signal with a corresponding beamforming filter for the beam direction and taking a sum of the convolved signals for the beam direction.

Example 6: The computer-implemented method of any of Examples 1-5, wherein the first class of sound may include a class of sound selected by the user and/or a predetermined class of sound and wherein the second class of sound may include an alternate class of sound selected by the user and/or a predetermined alternate class of sound.

Example 7: The computer-implemented method of any of Examples 1-6, wherein classifying the first beamformed signal and the second beamformed signal may include applying a deep learning model of sound classification to the first beamformed signal and the second beamformed signal.

Example 8: The computer-implemented method of any of Examples 1-7, wherein converting the calculated and adjusted beamformed signals into the spatialized binaural audio may include identifying a set of left-ear beam directions and a set of right-ear beam directions based on the position of the user, calculating a left-ear signal for the set of left-ear beam directions, and calculating a right-ear signal for the set of right-ear beam directions.

Example 9: The computer-implemented method of any of Examples 1-8, wherein calculating the left-ear signal may include convolving the calculated and adjusted beamformed signals with a set of left-ear HRTF filters for the set of left-ear beam directions and taking a sum of the convolved beamformed signals for the set of left-ear beam directions.

Example 10: The computer-implemented method of any of Examples 1-9, wherein calculating the right-ear signal may include convolving the calculated and adjusted beamformed signals with a set of right-ear HRTF filters for the set of right-ear beam directions and taking a sum of the convolved beamformed signals for the set of right-ear beam directions.

Example 11: The computer-implemented method of any of Examples 1-10 may further include detecting a new position of the user and recalculating the spatialized binaural audio for the new position of the user.

Example 12: The computer-implemented method of any of Examples 1-11 may further include adjusting a timing of a corresponding video based on a timing of the spatialized binaural audio and transmitting the adjusted video to the playback device of the user.

Example 13: A corresponding system for classifying beamformed signals for binaural audio playback may include several modules stored in memory, including 1) a reception module that receives a signal for each channel of an audio transducer array on a wearable device, 2) a calculation module that calculates a beamformed signal for each beam direction of a set of beamforming filters for the wearable device, 3) a classification module that classifies a first beamformed signal from the calculated beamformed signals into a first class of sound and a second beamformed signal from the calculated beamformed signals into a second class of sound, 4) an adjustment module that adjusts, based on the classifying, a gain of the first beamformed signal relative to the second beamformed signal, 5) a conversion module that converts the calculated and adjusted beamformed signals into spatialized binaural audio based on a position of a user, and 6) a transmitting module that transmits the spatialized binaural audio to a playback device of the user. The system may also include one or more hardware processors that execute the reception module, the calculation module, the classification module, the adjustment module, the conversion module, and the transmitting module.

Example 14: The system of Example 13, wherein the calculation module may calculate the beamformed signal by convolving each received signal with a corresponding beamforming filter for the beam direction and taking a sum of the convolved signals for the beam direction.

Example 15: The system of any of Examples 13 and 14, wherein the classification module may classify the first beamformed signal and the second beamformed signal by applying a deep learning model of sound classification to the first beamformed signal and the second beamformed signal.

Example 16: The system of any of Examples 13-15, wherein the conversion module may convert the calculated and adjusted beamformed signals into the spatialized binaural audio by identifying a set of left-ear beam directions and a set of right-ear beam directions based on the position of the user, calculating a left-ear signal for the set of left-ear beam directions, and calculating a right-ear signal for the set of right-ear beam directions.

Example 17: The system of any of Examples 13-16, wherein calculating the left-ear signal may include convolving the calculated and adjusted beamformed signals with a set of left-ear HRTF filters for the set of left-ear beam directions and taking a sum of the convolved beamformed signals for the set of left-ear beam directions.

Example 18: The system of any of Examples 13-17, wherein calculating the right-ear signal may include convolving the calculated and adjusted beamformed signals with a set of right-ear HRTF filters for the set of right-ear beam directions and taking a sum of the convolved beamformed signals for the set of right-ear beam directions.

Example 19: The system of any of Examples 13-18, wherein the conversion module may further detect a new position of the user and may recalculate the spatialized binaural audio for the new position of the user.

Example 20: The above-described method may be encoded as computer-readable instructions on a computer-readable medium. For example, a computer-readable medium may include one or more computer-executable instructions that, when executed by one or more processors of a computing device, may cause the computing device to 1) receive a signal for each channel of an audio transducer array on a wearable device, 2) calculate a beamformed signal for each beam direction of a set of beamforming filters for the wearable device, 3) classify a first beamformed signal from the calculated beamformed signals into a first class of sound and a second beamformed signal from the calculated beamformed signals into a second class of sound, 4) adjust, based on the classifying, a gain of the first beamformed signal relative to the second beamformed signal, 5) convert the calculated and adjusted beamformed signals into spatialized binaural audio based on a position of a user, and 6) transmit the spatialized binaural audio to a playback device of the user.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 900 in FIG. 9) or that visually immerses a user in an artificial reality (such as, e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
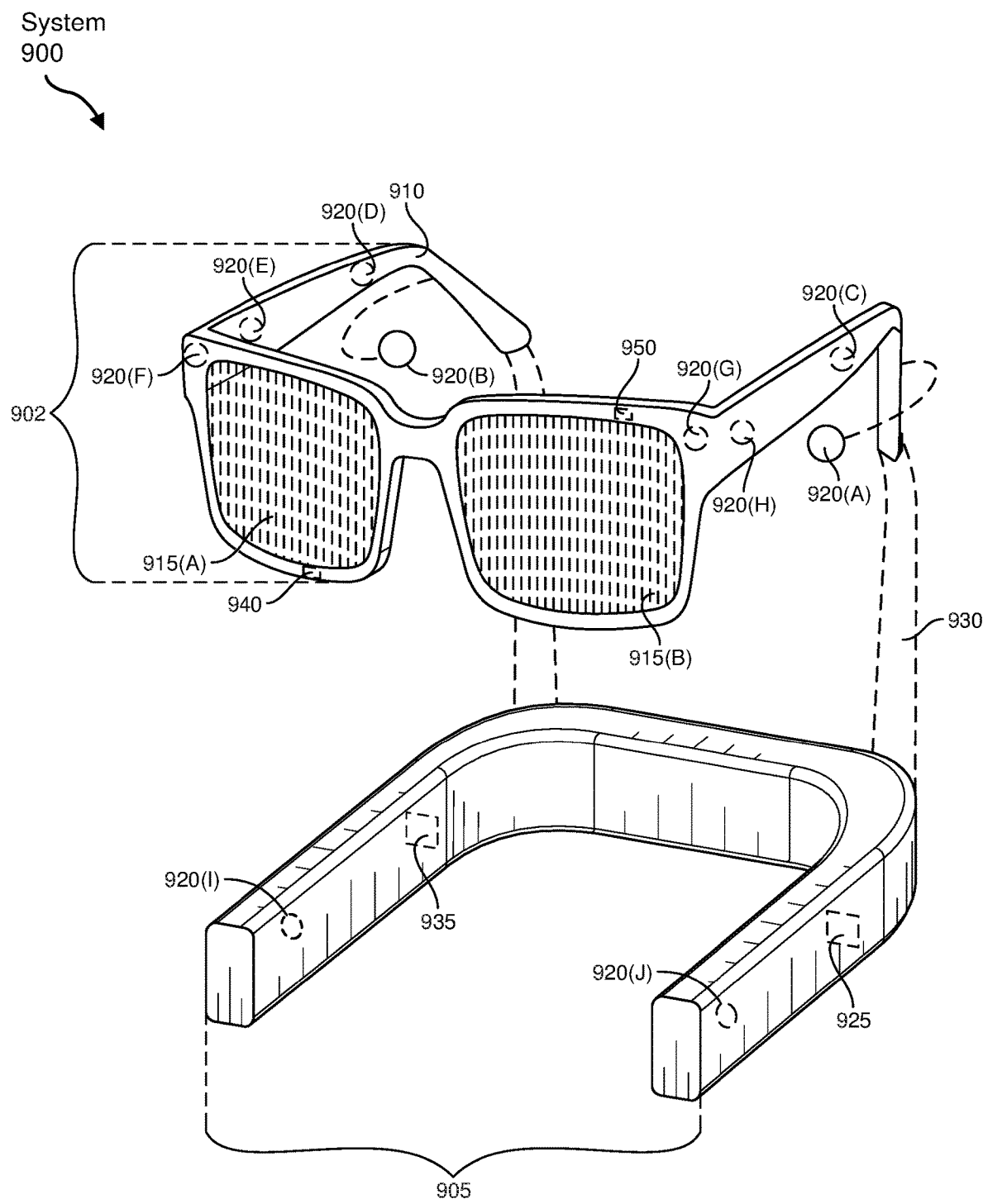
FIG. 9 is an illustration of exemplary augmented-reality glasses that may be used in connection with embodiments of this disclosure.
Figure 10:
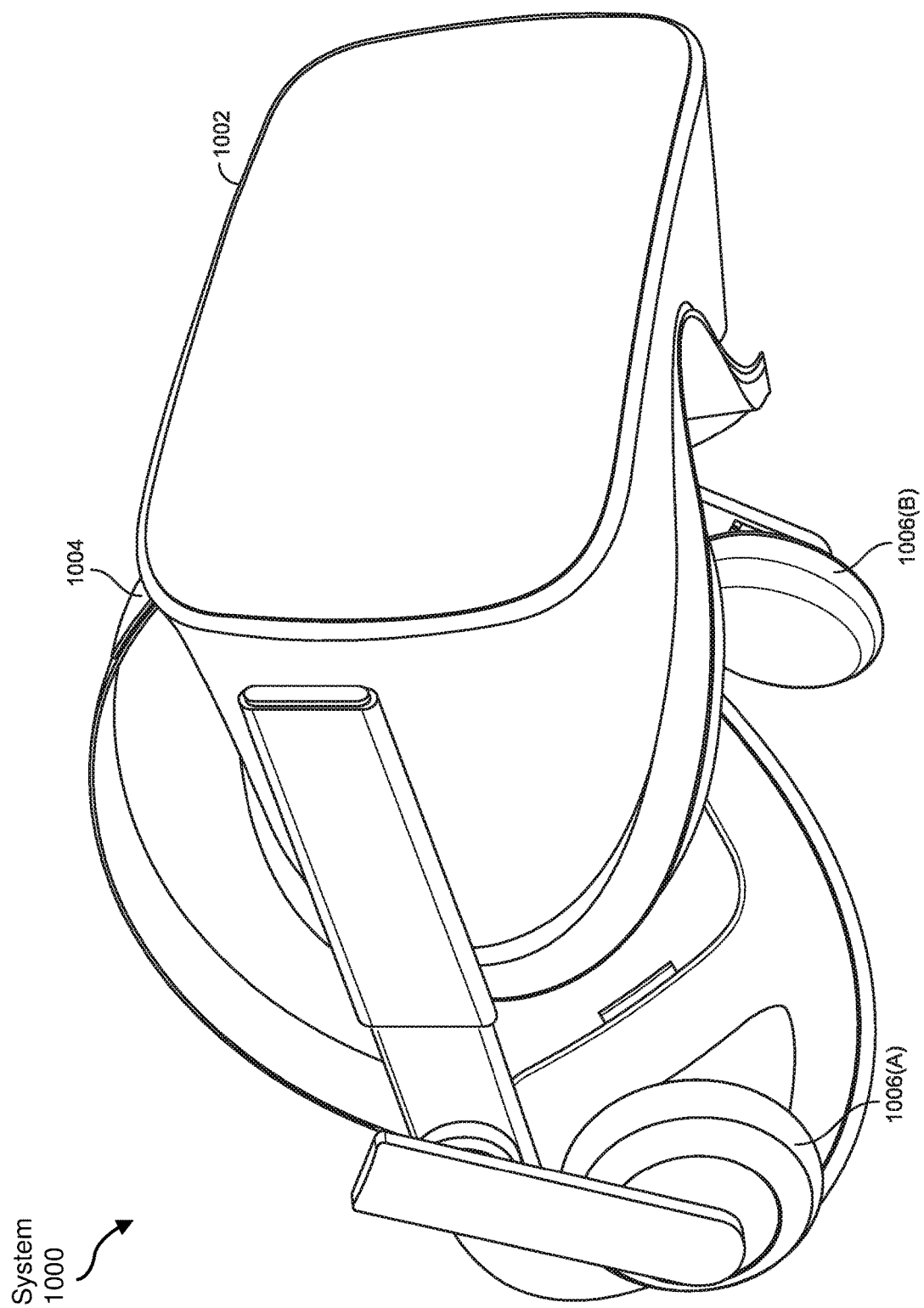
FIG. 10 is an illustration of an exemplary virtual-reality headset that may be used in connection with embodiments of this disclosure.

Turning to FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may represent one or more of a variety of different sensing mechanisms, such as a position sensor, an inertial measurement unit (IMU), a depth camera assembly, a structured light emitter and/or detector, or any combination thereof. In some embodiments, augmented-reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

In some examples, augmented-reality system 900 may also include a microphone array with a plurality of acoustic transducers 920(A)-920(J), referred to collectively as acoustic transducers 920. Acoustic transducers 920 may represent transducers that detect air pressure variations induced by sound waves. Each acoustic transducer 920 may be configured to detect sound and convert the detected sound into an electronic format (e.g., an analog or digital format). The microphone array in FIG. 10 may include, for example, ten acoustic transducers: 920(A) and 920(B), which may be designed to be placed inside a corresponding ear of the user, acoustic transducers 920(C), 920(D), 920(E), 920(F), 920(G), and 920(H), which may be positioned at various locations on frame 910, and/or acoustic transducers 920(I) and 920(J), which may be positioned on a corresponding neckband 905.

In some embodiments, one or more of acoustic transducers 920(A)-(F) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented-reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by an associated controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer 920, or some combination thereof.

Acoustic transducers 920(A) and 920(B) may be positioned on different parts of the user's ear, such as behind the pinna, behind the tragus, and/or within the auricle or fossa. Or, there may be additional acoustic transducers 920 on or surrounding the ear in addition to acoustic transducers 920 inside the ear canal. Having an acoustic transducer 920 positioned next to an ear canal of a user may enable the microphone array to collect information on how sounds arrive at the ear canal. By positioning at least two of acoustic transducers 920 on either side of a user's head (e.g., as binaural microphones), augmented-reality device 900 may simulate binaural hearing and capture a 3D stereo sound field around about a user's head. In some embodiments, acoustic transducers 920(A) and 920(B) may be connected to augmented-reality system 900 via a wired connection 930, and in other embodiments acoustic transducers 920(A) and 920(B) may be connected to augmented-reality system 900 via a wireless connection (e.g., a Bluetooth connection). In still other embodiments, acoustic transducers 920(A) and 920(B) may not be used at all in conjunction with augmented-reality system 900.

Acoustic transducers 920 on frame 910 may be positioned in a variety of different ways, including along the length of the temples, across the bridge, above or below display devices 915(A) and 915(B), or some combination thereof. Acoustic transducers 920 may also be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic transducer 920 in the microphone array.

In some examples, augmented-reality system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers, other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof.

Pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 905 may be communicatively coupled with eyewear device 902 and/or to other devices. These other devices may provide certain functions (e.g., tracking, localizing, depth mapping, processing, storage, etc.) to augmented-reality system 900. In the embodiment of FIG. 9, neckband 905 may include two acoustic transducers (e.g., 920(I) and 920(J)) that are part of the microphone array (or potentially form their own microphone subarray). Neckband 905 may also include a controller 925 and a power source 935.

Acoustic transducers 920(I) and 920(J) of neckband 905 may be configured to detect sound and convert the detected sound into an electronic format (analog or digital). In the embodiment of FIG. 9, acoustic transducers 920(I) and 920(J) may be positioned on neckband 905, thereby increasing the distance between the neckband acoustic transducers 920(I) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920(D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on neckband 905 and/or augmented-reality system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. A connector may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 900 and/or virtual-reality system 1000 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in augmented-reality system 900 and/or virtual-reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 900 and/or virtual-reality system 1000 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

When the user is wearing an augmented-reality headset or virtual-reality headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to as "localization," and the process of rendering playback of the audio source signal to appear as if it is coming from a specific direction may be referred to as "spatialization."

Localizing an audio source may be performed in a variety of different ways. In some cases, an augmented-reality or virtual-reality headset may initiate a DOA analysis to determine the location of a sound source. The DOA analysis may include analyzing the intensity, spectra, and/or arrival time of each sound at the artificial-reality device to determine the direction from which the sounds originated. The DOA analysis may include any suitable algorithm for analyzing the surrounding acoustic environment in which the artificial-reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique HRTF, which may be dictated by a user's anatomy including ear canal length and the positioning of the ear drum. The artificial-reality device may provide an alignment and orientation guide, which the user may follow to customize the sound signal presented to the user based on their unique HRTF. In some embodiments, an artificial-reality device may implement one or more microphones to listen to sounds within the user's environment. The augmented-reality or virtual-reality headset may use a variety of different array transfer functions (e.g., any of the DOA algorithms identified above) to estimate the direction of arrival for the sounds. Once the direction of arrival has been determined, the artificial-reality device may play back sounds to the user according to the user's unique HRTF. Accordingly, the DOA estimation generated using the ATF may be used to determine the direction from which the sounds are to be played from. The playback sounds may be further refined based on how that specific user hears sounds according to the HRTF.

In addition to or as an alternative to performing a DOA estimation, an artificial-reality device may perform localization based on information received from other types of sensors. These sensors may include cameras, IR sensors, heat sensors, motion sensors, GPS receivers, or in some cases, sensors that detect a user's eye movements. For example, as noted above, an artificial-reality device may include an eye tracker or gaze detector that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial-reality device may include one or more acoustic sensors that detect sounds within range of the device. A controller of the artificial-reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial-reality device may re-render (i.e., spatialize) the sound signals to sound as if coming from the direction of that sound source. The artificial-reality device may apply filters or other digital signal processing that alter the intensity, spectra, or arrival time of the sound signal. The digital signal processing may be applied in such a way that the sound signal is perceived as originating from the determined location. The artificial-reality device may amplify or subdue certain frequencies or change the time that the signal arrives at each ear. In some cases, the artificial-reality device may create an acoustic transfer function that is specific to the location of the device and the detected direction of arrival of the sound signal. In some embodiments, the artificial-reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial-reality device (or speakers associated with the device) may re-render an audio signal to sound as if originating from a specific location.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive an audio signal to be transformed, transform the audio signal, output a result of the transformation to classify the audio signal to a type of sound, use the result of the transformation to convert the audio signal into spatialized audio, and store the result of the transformation to transmit the spatialized audio for user playback. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, by a computing device, a signal for each channel of an audio transducer array on a wearable device, wherein the received signal is captured by the wearable device when worn by a user;
   calculating, by the computing device, a beamformed signal for each beam direction of a set of beamforming filters for the wearable device;
   classifying, by the computing device, a first beamformed signal from the calculated beamformed signals into a first class of sound and a second beamformed signal from the calculated beamformed signals into a second class of sound;
   adjusting, based on the classifying, a gain of the first beamformed signal relative to the second beamformed signal to enable sound mixing;
   converting, by the computing device, the calculated and adjusted beamformed signals into spatialized binaural audio based on a position of the user wearing the wearable device and a position of a virtual user independent of the position of the user wearing the wearable device, wherein the spatialized binaural audio is updated in real time based on a new position of the user wearing the wearable device and a new position of the virtual user;
   rotating a corresponding video and recalculating a timing of the corresponding video based on the new position of the user wearing the wearable device and the new position of the virtual user; and
   transmitting the spatialized binaural audio and the corresponding video to a playback device of the virtual user, wherein the spatialized binaural audio and the corresponding video replicates a real-world user experience shared from the wearable device to the playback device as the virtual user's point-of-view.

2. The method of claim 1, wherein the set of beamforming filters comprises preprocessed filters created by testing the audio transducer array of the wearable device in an anechoic chamber.

3. The method of claim 2, wherein testing the audio transducer array of the wearable device comprises:
   capturing test audio with the audio transducer array of the wearable device worn on a model head;
   measuring a set of array transfer functions (ATFs) for the audio transducer array based on the captured test audio; and
   calculating the set of beamforming filters using the set of ATFs.

4. The method of claim 3, wherein measuring the set of ATFs further comprises measuring a set of head-related transfer functions (HRTFs).

5. The method of claim 1, wherein calculating the beamformed signal comprises:
   convolving each received signal with a corresponding beamforming filter for the beam direction; and
   taking a sum of the convolved signals for the beam direction.

6. The method of claim 1, wherein:
   the first class of sound comprises at least one of:
     a class of sound selected by the virtual user; or
     a predetermined class of sound; and
   the second class of sound comprises at least one of:
     an alternate class of sound selected by the virtual user; or
     a predetermined alternate class of sound.

7. The method of claim 1, wherein classifying the first beamformed signal and the second beamformed signal comprises applying a deep learning model of sound classification to the first beamformed signal and the second beamformed signal.

8. The method of claim 1, wherein converting the calculated and adjusted beamformed signals into the spatialized binaural audio comprises:
   identifying a set of left-ear beam directions and a set of right-ear beam directions based on the position of the user wearing the wearable device and the position of the virtual user;
   calculating a left-ear signal for the set of left-ear beam directions; and
   calculating a right-ear signal for the set of right-ear beam directions.

9. The method of claim 8, wherein calculating the left-ear signal comprises:
   convolving the calculated and adjusted beamformed signals with a set of left-ear HRTF filters for the set of left-ear beam directions; and
   taking a sum of the convolved beamformed signals for the set of left-ear beam directions.

10. The method of claim 8, wherein calculating the right-ear signal comprises:
    convolving the calculated and adjusted beamformed signals with a set of right-ear HRTF filters for the set of right-ear beam directions; and
    taking a sum of the convolved beamformed signals for the set of right-ear beam directions.

11. The method of claim 1, further comprising:
    detecting the new position of the user wearing the wearable device or the virtual user; and
    recalculating the spatialized binaural audio for the new position of the user wearing the wearable device or the virtual user.

12. The method of claim 1, further comprising:
    adjusting the timing of the corresponding video based on a timing of the spatialized binaural audio; and
    transmitting the adjusted corresponding video to the playback device of the virtual user.

13. A system comprising:
    a reception module, stored in memory, that receives a signal for each channel of an audio transducer array on a wearable device, wherein the received signal is captured by the wearable device when worn by a user;
    a calculation module, stored in memory, that calculates a beamformed signal for each beam direction of a set of beamforming filters for the wearable device;
    a classification module, stored in memory, that classifies a first beamformed signal from the calculated beamformed signals into a first class of sound and a second beamformed signal from the calculated beamformed signals into a second class of sound;
    an adjustment module, stored in memory, that adjusts, based on the classifying, a gain of the first beamformed signal relative to the second beamformed signal to enable sound mixing;
    a conversion module, stored in memory, that:
    converts the calculated and adjusted beamformed signals into spatialized binaural audio based on a position of the user wearing the wearable device and a position of a virtual user independent of the position of the user wearing the wearable device, wherein the spatialized binaural audio is updated in real time based on a new position of the user wearing the wearable device and a new position of the virtual user; and
    rotates a corresponding video and recalculating a timing of the corresponding video based on the new position of the user wearing the wearable device and the new position of the virtual user;
    a transmitting module, stored in memory, that transmits the spatialized binaural audio and the corresponding video to a playback device of the virtual user, wherein the spatialized binaural audio and the corresponding video replicates a real-world user experience shared from the wearable device to the playback device as the virtual user's point-of-view; and
    at least one processor that executes the reception module, the calculation module, the classification module, the adjustment module, the conversion module, and the transmitting module.

14. The system of claim 13, wherein the calculation module calculates the beamformed signal by:
    convolving each received signal with a corresponding beamforming filter for the beam direction; and
    taking a sum of the convolved signals for the beam direction.

15. The system of claim 13, wherein the classification module classifies the first beamformed signal and the second beamformed signal by applying a deep learning model of sound classification to the first beamformed signal and the second beamformed signal.

16. The system of claim 13, wherein the conversion module converts the calculated and adjusted beamformed signals into the spatialized binaural audio by:
    identifying a set of left-ear beam directions and a set of right-ear beam directions based on the position of the user wearing the wearable device and the position of the virtual user;
    calculating a left-ear signal for the set of left-ear beam directions; and
    calculating a right-ear signal for the set of right-ear beam directions.

17. The system of claim 16, wherein calculating the left-ear signal comprises:
    convolving the calculated and adjusted beamformed signals with a set of left-ear HRTF filters for the set of left-ear beam directions; and
    taking a sum of the convolved beamformed signals for the set of left-ear beam directions.

18. The system of claim 16, wherein calculating the right-ear signal comprises:
    convolving the calculated and adjusted beamformed signals with a set of right-ear HRTF filters for the set of right-ear beam directions; and
    taking a sum of the convolved beamformed signals for the set of right-ear beam directions.

19. The system of claim 13, wherein the conversion module further:
    detects the new position of the user wearing the wearable device or the virtual user; and
    recalculates the spatialized binaural audio for the new position of the user wearing the wearable device or the virtual user.

20. A non-transitory computer-readable medium comprising one or more computer-executable instructions that, when executed by at least one processor of a computing device, cause the computing device to:

receive a signal for each channel of an audio transducer array on a wearable device, wherein the received signal is captured by the wearable device when worn by a user;

calculate a beamformed signal for each beam direction of a set of beamforming filters for the wearable device;

classify a first beamformed signal from the calculated beamformed signals into a first class of sound and a second beamformed signal from the calculated beamformed signals into a second class of sound;

adjust, based on the classifying, a gain of the first beamformed signal relative to the second beamformed signal to enable sound mixing;

convert the calculated and adjusted beamformed signals into spatialized binaural audio based on a position of the user wearing the wearable device and a position of a virtual user independent of the position of the user wearing the wearable device, wherein the spatialized binaural audio is updated in real time based on a new position of the user wearing the wearable device and a new position of the virtual user;

rotate a corresponding video and recalculating a timing of the corresponding video based on the new position of the user wearing the wearable device and the new position of the virtual user; and transmit the spatialized binaural audio and the corresponding video to a playback device of the virtual user, wherein the spatialized binaural audio and the corresponding video replicates a real-world user experience shared from the wearable device to the playback device as the virtual user's point-of-view.

* * * * *